Nov. 9, 1954  S. B. ALLEN  2,694,118
LIGHT FLASHING SWITCH
Filed Jan. 30, 1952  3 Sheets-Sheet 1
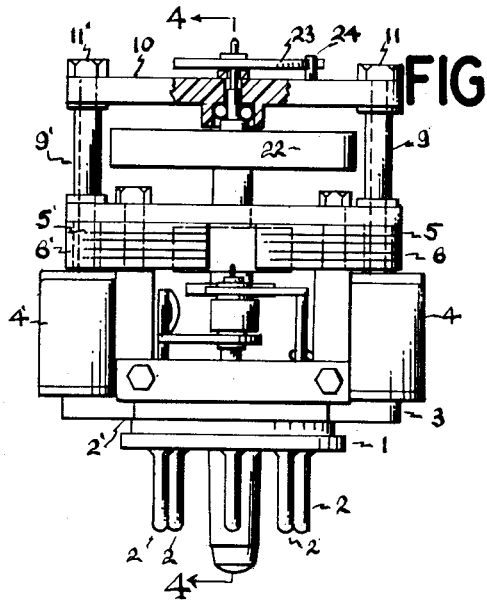
FIG. 1
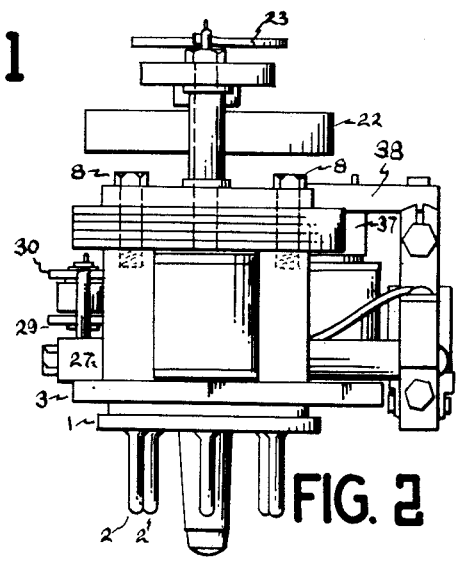
FIG. 2
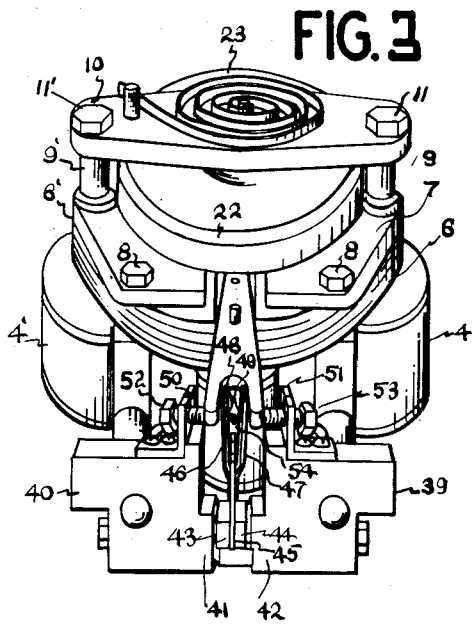
FIG. 3
FIG. 4
INVENTOR.
Stratford B. Allen
BY
his Attorney Nov. 9, 1954 S. B. ALLEN 2,694,118
LIGHT FLASHING SWITCH
Filed Jan. 30, 1952 3 Sheets-Sheet 2

INVENTOR.
Stratford B. Allen
BY Ezekiel Wolf
his Attorney

Nov. 9, 1954 S. B. ALLEN 2,694,118
LIGHT FLASHING SWITCH
Filed Jan. 30, 1952 3 Sheets-Sheet 3

INVENTOR.
Stratford B. Allen.
BY
Ezekiel Wolf.
his Attorney

United States Patent Office 2,694,118
Patented Nov. 9, 1954

2,694,118

LIGHT FLASHING SWITCH

Stratford B. Allen, Sharon, Mass., assignor to Joseph Pollak Corporation, Dorchester, Mass., a corporation of Massachusetts Application January 30, 1952, Serial No. 269,063

6 Claims. (Cl. 200—90)

The present invention relates to a timing flasher unit and housing assembly particularly useful for aircrafts where groups of lights are flashed on and off at a definite selected frequency of operation when the aircraft is in flight. Such a flashing unit is particularly useful for the alternate flashing of right and left wing lights and tail lights on aircraft and other moving vehicles or vessels and also on stationary bodies.

In accordance with the present invention, the flasher unit is operated at a definite flash frequency in the range or vicinity of 40 cycles per minute, that is 80 make and breaks per minute and the interval of flash is regularly established in a simple and accurate device which is compact and small and capable of withstanding severe tests for use on commercial and other types of air craft. The flasher avoids the use of a rotating motor and reduction gearing and in fact is operated by an oscillating unit controlled in frequency by a balance wheel and hair spring.

Further and other improvements in the present invention including the structural assembly will be more fully explained in the specification set forth below when taken in connection with the drawings illustrating an embodiment thereof, in which:

Figure 1 shows an elevation of the flashing mechanism as viewed from one side with portions partly in section.

Figure 2 shows a view corresponding to a side view of the device of Figure 1 looking from the right of Figure 1.

Figure 3 shows a perspective view looking at the flasher downward at an angle from the top.

Figure 4 shows a section substantially along the section line 4—4 of Figure 1.

Figure 5:
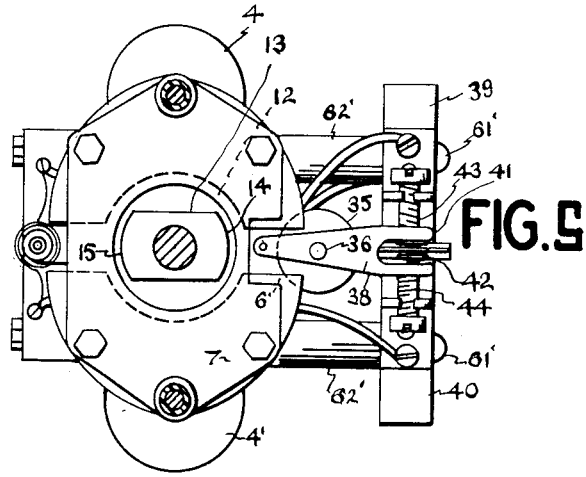
Figure 5 shows a section substantially on the line 5—5 of Figure 4.

In the arrangement indicated in the figures, the whole assembly is arranged to be mounted in a socket with the base or plug 1 having projecting prongs 2—2 forming the plug terminals for the entire flashing unit. Mounted at the base 1 is a plate 3 of magnetic permeable metal upon which is mounted two impulse coils 4 and 4' through which magnetic permeable cores 5 and 5' secured in the plate 3 extend. Mounted over the coils 4 and 4' are two sets of laminated pole pieces 6 and 6' through which the cores 5 and 5' pass and over the laminated magnetic permeable poles 6 and 6' is a clamping plate 7 of non-magnetic material of aluminum or some other non-magnetic material, but aluminum is preferable because it is light. The plate 3, cores 5 and 5' and the pole pieces 6 and 6' form a magnetic circuit which is energized by the coils 4 and 4'.

The plate 7 as indicated in Figure 5 extends over both pole pieces 6 and 6' and is held by screws 8 to the laminated pole pieces 6. The screws 8 pass through the plate 7 and into square corner posts 60' secured on the plate 3 forming a rigid frame.

As indicated further in Figures 1 and 3 over the clamping plate 7 are two upwardly extending hollow spacers 9, 9' through which pass two screws 11, 11' which hold a top yoke 10. These spacers on their lower end rest in the plate 7 and at their upper end support the top yoke 10 by means of which the whole structure is supported as a unit. The lower ends of the screws 11, 11' thread into the upper ends of the magnet cores 5, 5'. The pole pieces 6 and 6' are arcuate in shape with a centrally located opening 12 in which is positioned a rotor 13 formed with two parallel sides and arcuate ends 14 and 15 magnetized as opposing poles by making the rotor 13 a permanent magnet with the lines of force running parallel to the parallel sides. The rotor is mounted and supported on a spindle 16 which sets in a thrust bearing 17 formed around a shoulder near the top of the spindle and at its lower end by a thrust bearing 18 at the bottom of the spindle. This spindle carries a flat disc 19 from which a pin 20 projects from the lower face near the periphery of the disc.

Just above the rotor the spindle supports a fly wheel 22 secured to rotate with the spindle. The top end of the spindle has secured to it one end of a hair spring 23, the other end of which is attached to a pin 24 secured in the top yoke 10. The pin 20 on the disc 19 is positioned in its normal inoperative position to bear against one or the other of contact elements 25 or 32 mounted in a pivoted insulating plate 26 and bearing against an insulating tongue 31 projecting from the plate 26 in the path of movement of the pin 24, so that as the pin moves, contact is made in one direction with the element 25 and in the other direction with the element 32. The plate 26 is pivoted by means of a spindle 28 which sets into the supporting block 27. Surrounding the spindle 28 is an insulating sleeve 60 upon which are secured two conducting collars 61 above the plate 26 and 62 below the plate 26. Each of these conductive collars have secured to them pig tail conductive hair springs 30 and 29 respectively. The conductive collar 61 connects to the contact 25 while the collar 62 connects to the contact 32 so that current from the surface 25 passes through the hair spring 29. The other end of the hair spring 30 is connected to the contact post 33 mounted in the insulating block 27 and the other end of the hair spring 29 is connected to the contact post 34 also mounted in the insulating block 27 on the other end of the block away from the post 33.

Figure 6:
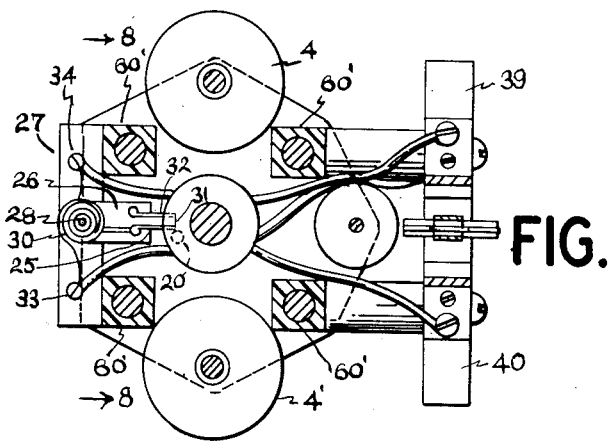
Figure 6 shows a section substantially along the line 6—6 of Figure 4.

When the instrument is at rest the timing contact pin 20 presses lightly against one side contact plate 25 in the region of the timing contact tongue 31 as indicated in Figure 6, although the pin may be in a position to press against the opposite face of the tongue 31 depending upon the position of the pin 20. This engagement will energize the impulse coil 4 causing the magnet pole rotor 13 to turn and moving thereby past the tongue 31 of the plate 26 whereupon the contact between the pin 20 and the contact 25 will be broken and the coil 4 deenergized. Due however to the inertia of the balance wheel or fly wheel 22, the rotor assembly continues to rotate until arrested by the torque of the hair spring 23 which then reverses the direction of rotation. As the timing contact pin 20 strikes the opposite side contact plate 32 upon its return, the opposite coil 4' receives an impulse which causes the rotor 13 to turn in the opposite direction, counterclockwise, as viewed in Figure 6 until the pin passes by the contact finger 31, in the opposite direction from that in which it was previously going. The balance wheel inertia together with the hair spring torque completes the second half cycle of the timer to its original position and oscillation of the system at a prescribed frequency is maintained until the current to the instrument is cut off.

Mounted on the base plate 3 is a polarizing coil 35 which has a magnetic core or spindle 36 passing through its center upon which an armature 37 is free to move. The armature 37 carries fixed to it an insulating fork 38. The armature 37 is free to move from against one pole piece 6 to the other pole piece 6' as the coils 4 and 4' are respectively energized and this also swings the pivoted insulating fork 38. The movement of the fork 38 causes alternate operation of two sets of lighting circuits which will presently be explained.

Figure 7:
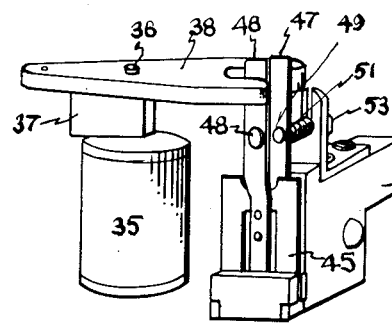
Figure 7 shows in perspective a detail shown in Figures 2, 3 and 4.

The lighting contact switches are mounted in a base comprising two blocks 39 and 40 which are secured to the frame post 60' mounted on the plate 3, by means of the screws 61' which pass through the blocks 39 and 40 and through sleeves 62', 62' which space the blocks 39 and 40 away from the posts 60'. Between the two opposing inwardly projecting shoulders 41 and 42 of the blocks 39 and 40, are a pair of clamping blocks 43 and 44 which hold in place a spring stem 45 on each side of which are attached switch arms 46 and 47. These switch arms carry contact bosses 48 and 49, see Figures 6 and 7, which are positioned to engage adjustable contacts 50 and 51 mounted on the end of screws 52 and 53. A small coiled spring 54 is mounted between the blades 46 and 47 so that as the fork 38 is moved one way or the other, the blades 46 and 47 close either contacts 48 and 50 or contacts 49 and 51.

The operation of the flasher follows from the description given above. As the rotor assembly oscillates on the spindle 16, first one impulse coil 4 and then the other 4' is energized, which action reciprocates the pivoted fork 38 by attracting the armature 37, first to one pole piece 6 and then to the opposite pole piece 6' causing positive closures for a definite time, first to one set of contacts 49 and 51, and then the other set of contacts 48 and 50 of the separate lighting circuits.

The pole pieces 6 and 6' and the polarizing coil 35 serve as a polarizing relay since the magnetic circuit is first through the polarizing coil to one pole piece and then to the other pole piece.

Figure 10:
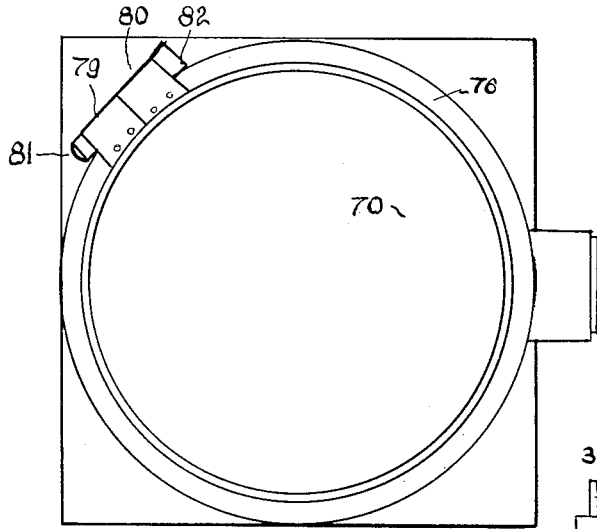
Figure 10 shows a top plan view of the housing shown in Figure 9.
Figure 8:
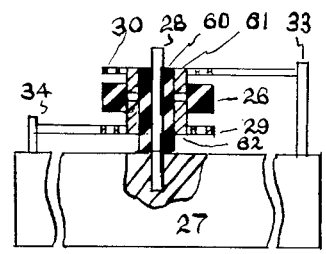
Figure 8 shows a detail section taken on the line 8—8 of Figure 6.
Figures 9, 11:
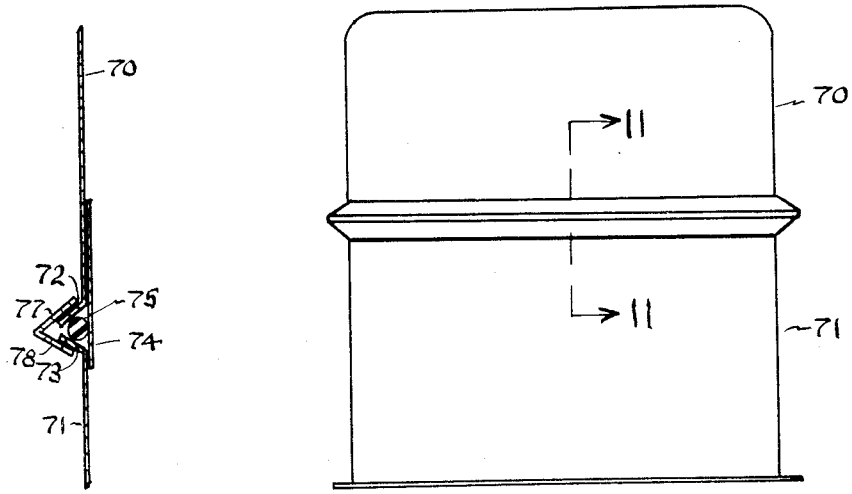
Figure 9 shows a side elevation of the housing containing the unit.
Figure 11 shows a fragmentary section taken on the line 11—11 of Figure 9.

It is important that the unit is contained in a sealed housing and for this purpose the housing shown in Figures 9, 10 and 11 has been found extremely suitable. This housing essentially comprises two thin walled interengaging can sections 70 and 71, the former forming the top section of the can and the latter the bottom section as seen in Figure 9.

Sections 70 and 71 both have outturned flanges or lips 72 and 73 respectively, which are about ¼" wide, extending all around the can and are at angles of about 60° with the walls. The upper section 70 also has an internal collar or sleeve 74 secured to the inside wall and extending below the flanged edge 72 sufficient to engage the inner surface of the wall of the lower section 71 when the two parts are put together. When the two parts are put together an O ring 75 of rubber or rubber-like material is placed between the two flanges 72 and 73 on top and bottom with the collar 74 serving as a back supporting surface. Over the flanges 72 and 73 is slipped a clamping ring 76 having walls 77 and 78 forming in section a V as seen in Figure 11. The clamping ring 76 has at its ends, blocks 79 and 80 which are drilled through to hold a clamping screw 81 and nut 82 for bringing the ring end together.

In place of the screw and nut, one of the blocks may be threaded to receive the screw passing through the other block. When the ring is closed the two flanges 72 and 73 are substantially brought together and a tight seal is effected.

Having now described my invention, I claim:

1. A flasher unit for energizing a lighting circuit comprising a rotor assembly including a pivoted permanent magnet armature including a pair of impulse coils for providing a magnetic field having poles positioned substantially in the same plane as said permanent magnet for oscillating the permanent magnet when alternately energized, an electrical contact pin carried by said rotor assembly, a pivoted arm having an end with contacts mounted on each side thereof positioned to engage said contact pin as the rotor assembly is turned, a pair of pigtail conductive hair springs mounted on said pivoted arm but insulated from each other with each hair spring connected to one of said contacts on the arm, said contact pin on said rotor assembly in normal inoperative position being in engagement with one contact on the side of said pivoted arm, means completing an electric circuit between said conductive hair springs, said impulse coils and the pin on said rotor assembly for alternately energizing one or the other of said impulse coils as the pin makes contact with one or the other of said contacts on said pivoted arm, a second pivoted magnet mounted in position to be attracted alternately to one or the other of said field poles as its impulse coil is energized and electrical switching means alternately energized by said pivoted magnet for energizing a lighting circuit.

2. A flasher unit for energizing a lighting circuit comprising a permanent magnet rotor pivoted to oscillate in a magnetic field, means for establishing said magnetic field including a pair of impulse coils alternately energized, means for alternately energizing said coils including a contact pin carried by said rotor and a pair of spring pivoted contacts positioned to be alternately engaged by said pin for alternately energizing said impulse coils, a second pivoted magnet positioned to be oscillated in said magnetic field, an electrical switching means having switching contacts for energizing said lighting circuit in a preestablished alternate sequence and means carried by said pivoted magnet for operating said electrical switching means.

3. A flasher unit for energizing a lighting circuit comprising a permanent magnet rotor pivoted to oscillate in a magnetic field, means for establishing a predetermined period of oscillation including a balance wheel and balance spring, means for establishing said magnetic field including a pair of impulse coils alternately energized, means for alternately energizing said coils including a contact pin carried by said rotor and a pair of spring pivoted contacts positioned to be alternately engaged by said pin for alternately energizing said impulse coils, a second pivoted magnet positioned to be oscillated in said magnetic field, an electrical switching means having switching contacts for energizing said lighting circuit in a preestablished alternate sequence and means carried by said pivoted magnet for operating said electrical switching means.

4. A flasher unit for energizing a lighting circuit, comprising a permanent magnet rotor pivoted to oscillate in a magnetic field, means for establishing said magnetic field including a pair of impulse coils alternately energized, means for alternately energizing said coils including a contact pin carried by said rotor and a pair of spring pivoted contacts positioned to be alternately engaged by said pin for alternately energizing said impulse coils, spring means biasing said rotor to keep said contact pin normally in inoperative position against one or the other of said pair of spring pivoted contacts, a second pivoted magnet positioned to be oscillated in said magnetic field, an electrical switching means having switching contacts for energizing said lighting circuit in a preestablished alternate sequence and means carried by said pivoted magnet for operating said electrical switching means.

5. A flasher unit for energizing a lighting circuit comprising a permanent magnet rotor pivoted to oscillate in a magnetic field, means for establishing a predetermined period of oscillation including a balance wheel and balance spring, means for establishing said magnetic field including a pair of impulse coils alternately energized, means for alternately energizing said coils including a contact pin carried by said rotor and a pair of spring pivoted contacts positioned to be alternately engaged by said pin for alternately energizing said impulse coils, a second pivoted magnet positioned to be oscillated in said magnetic field, an electrical switching means having switching contacts for energizing said lighting circuit in a preestablished alternate sequence and means carried by said pivoted magnet for operating said electrical switching means, said balance spring exerting an initial force to keep said contact pin normally in inoperative position against one or the other of said pair of spring pivoted contacts.

6. A flasher unit for energizing a lighting circuit comprising a permanent magnet rotor pivoted to oscillate in a magnetic field, means for establishing said magnetic field including a pair of impulse coils alternately energized, means for alternately energizing said coils including a contact pin carried by said rotor and a pair of spring pivoted contacts positioned to be alternately engaged by said pin for alternately energizing said impulse coils, a second pivoted magnet positioned to be oscillated in said magnetic field, an electrical switching means having switching contacts for energizing said lighting circuit in a preestablished alternate sequence and means carried by said pivoted magnet for operating said electrical switching means, said electrical switching means being normally biased to have one set of contacts closed when the unit is in an inoperative position.

References Cited in the file of this patent

UNITED STATES PATENTS

| Number | Name | Date |
|---|---|---|
| 1,914,929 | Sorensen | June 20, 1933 |
| 2,052,319 | Siegmund | Aug. 25, 1936 |
| 2,274,558 | Murray | Feb. 24, 1942 |
| 2,388,934 | Pearson | Nov. 13, 1945 |
| 2,589,369 | Granquist | Mar. 18, 1952 |